(12) United States Patent
Chen et al.

(10) Patent No.: US 8,534,778 B2
(45) Date of Patent: Sep. 17, 2013

(54) COMPUTER ENCLOSURE

(75) Inventors: Yun-Lung Chen, New Taipei (TW);
Liang-Chin Wang, New Taipei (TW);
Gang Su, Wuhan (CN); Ling-Xin Zeng,
Wuhan (CN); Zhong-Jie Liu, Wuhan
(CN)

(73) Assignees: **Hong Fu Jin Precision Industry
(WuHan) Co., Ltd., Wuhan (CN); Hon
Hai Precision Industry Co., Ltd.**, New
Taipei (TW)

( * ) Notice: Subject to any disclaimer, the term of this patent is extended or adjusted under 35 U.S.C. 154(b) by 0 days.

(21) Appl. No.: 13/446,204

(22) Filed: Apr. 13, 2012

(65) Prior Publication Data
US 2013/0026894 A1   Jan. 31, 2013

(30) Foreign Application Priority Data

Jul. 28, 2011  (CN) .......................... 2011 1 10213289

(51) Int. Cl.
*A47B 97/00*         (2006.01)
(52) U.S. Cl.
USPC ....................................... 312/223.2; 312/306
(58) Field of Classification Search
USPC ................... 312/223.2, 139.2, 306, 304, 307,
312/292, 350; 361/679.02, 679.4, 679.45,
361/727; 439/135, 136
See application file for complete search history.

(56) References Cited

U.S. PATENT DOCUMENTS

| | | | | |
|---|---|---|---|---|
| 263,670 | A * | 9/1882 | Bauch | 49/413 |
| 2,565,845 | A * | 8/1951 | Frederick | 312/246 |
| 3,587,442 | A * | 6/1971 | Jakeway | 454/319 |
| 5,169,218 | A * | 12/1992 | Chu | 312/223.2 |
| 6,415,622 | B2 * | 7/2002 | Kim et al. | 62/409 |
| 6,652,297 | B1 * | 11/2003 | Zhang et al. | 439/136 |
| 7,375,955 | B2 * | 5/2008 | Xu | 361/679.55 |
| 7,722,136 | B2 * | 5/2010 | Chen et al. | 312/223.2 |
| 7,889,493 | B2 * | 2/2011 | Lee | 361/679.4 |
| 8,139,148 | B2 * | 3/2012 | Okita | 348/376 |
| 2008/0247130 | A1 * | 10/2008 | Chen | 361/685 |
| 2009/0154080 | A1 * | 6/2009 | Lee et al. | 361/679.02 |
| 2010/0231106 | A1 * | 9/2010 | Okita | 312/312 |
| 2012/0056520 | A1 * | 3/2012 | Liu et al. | 312/312 |

* cited by examiner

*Primary Examiner* — Janet M Wilkens
(74) *Attorney, Agent, or Firm* — Altis Law Group, Inc.

(57) ABSTRACT

An enclosure includes a chassis, a front panel installed on the chassis, and a cover. The front panel defines an opening. Two mounting board are located on the front panel. Each of the two mounting board defines a first slots. The cover includes a base wall and two sidewalls located on opposite sides of the base wall. A first latching portion is located on the sidewall. The first latching portion is slidabaly engaged in the first slot. The cover is slidable relative to the front panel to the base wall covering the opening or uncovering the opening.

16 Claims, 5 Drawing Sheets

COMPUTER ENCLOSURE

BACKGROUND

1. Technical Field

The present disclosure relates to computer enclosures, and particularly to a computer enclosure with a cover.

2. Description of Related Art

In a computer enclosure or a sever enclosure, the front panel of the enclosure defines an opening for receiving expansion ports, such as a USB port. The expansion ports are uncovered, so the expansion ports may encounter environmental hazards such as dust and moisture, thus reducing the lifespan of the expansion ports.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
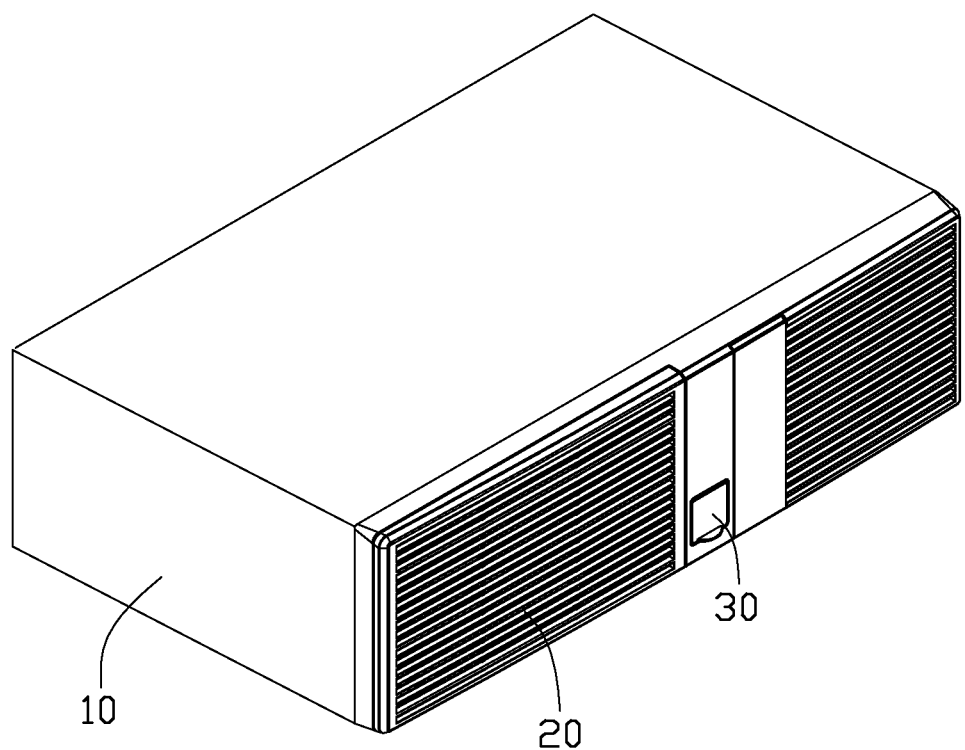
FIG. 1 is an assembled, isometric view of an enclosure, the enclosure including a cover and a front panel.

Referring to FIG. 1, an enclosure includes a chassis 10, a front panel 20, and a cover 30.

Figure 2:
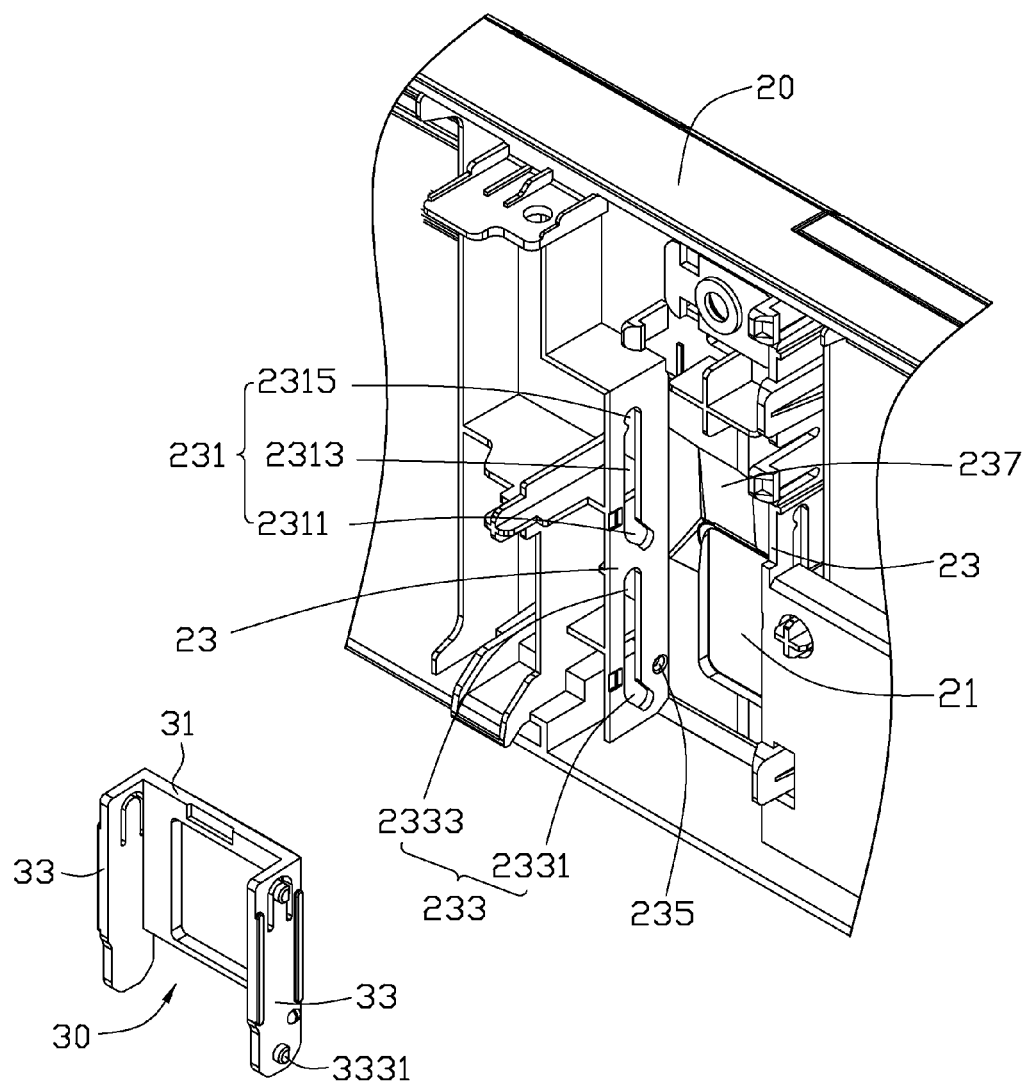
FIG. 2 is a cutaway, exploded view of the front panel and the cover of FIG. 1.

Referring to FIG. 2, the front panel 20 defines an opening 21. Two mounting boards 23 are located on an inner side of the front panel 20 and arranged at two opposite sides of the opening 21. In one embodiment, the two mounting boards 23 are substantially parallel to each other. Each of the two mounting boards 23 defines a first slot 231 and a second slot 233 below the first slot 231. The first slot 231 includes a first short portion 2311, a first long portion 2313 communicating with the first short portion 2311, and a stopping portion 2315 communicating with the first long portion 2313. In one embodiment, an extension direction of the first long portion 2313 is substantially parallel to each of the two mounting boards 23, and an obtuse angle is defined between the first short portion 2311 and the first long portion 2313. The second slot 233 includes a second short portion 2331 and a second long portion 2333 communicating with the second short portion 2331. In one embodiment, an obtuse angle is defined between the second short portion 2331 and the second long portion 2333. Each of the two mounting boards 23 defines a recess 235 placed in the back of the second slot 233. A receiving space 237 is defined between the two mounting boards 23 and is placed on the top of the opening 21, for receiving the cover 30.

Figure 3:
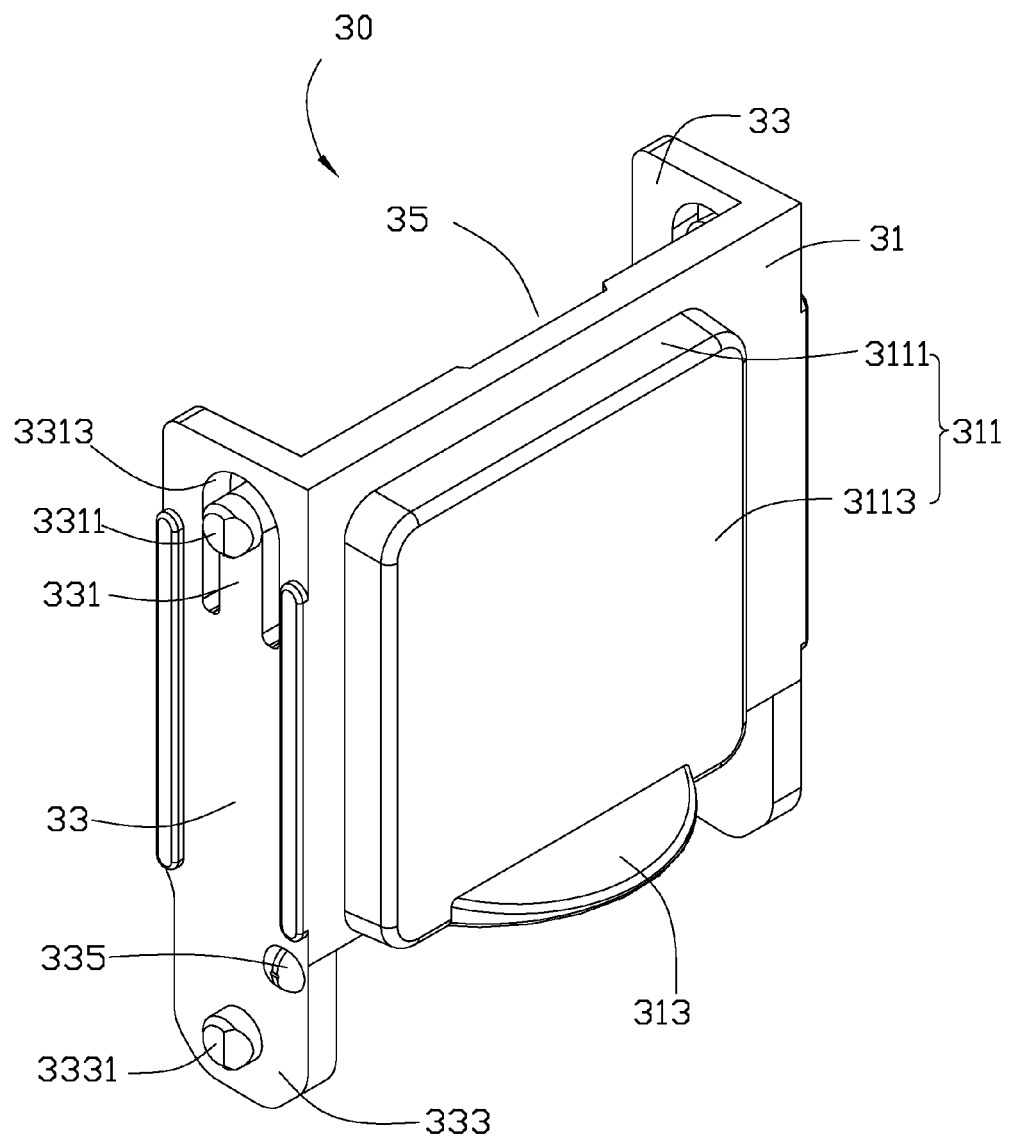
FIG. 3 is an isometric view of the cover of FIG. 2.

Referring to FIG. 3, the cover 30 includes a base wall 31 and two sidewalls 33 located on two opposite sides of the base wall 31. In one embodiment, each of the two sidewalls 33 is substantially perpendicular to the base wall 31, and the base wall 31 is substantially rectangular. The base wall 31 and the two sidewalls 33 cooperatively define an installation space 35 for receiving an expansion device 5 (shown in FIG. 5). A covering portion 311 is located in the front of the base wall 31. The covering portion 311 includes four connecting portions 3111 and a covering board 3113 connected to the four connecting portions 3111. In one embodiment, each of the four connecting portions 3111 is substantially perpendicular to the base wall 31, and the covering board 3113 is substantially parallel to the base wall 31. An operating portion 313 extends from the covering board 3113. In one embodiment, the operating portion 313 is substantially arc-shaped.

A resilient piece 331 extends from each of the two sidewalls 33. A first latching portion 3311 is located on the distal end of the resilient piece 331. In one embodiment, the resilient piece 331 and the sidewall 33 are in the same plane. The sidewall 33 defines a groove 3313 around the resilient piece 331. The resilient piece 331 is elastically deformable in the groove 3313. An extension piece 333 extends from the distal end of each of the two sidewalls 33. A second latching portion 3331 is located on distal end of the extension piece 333. A protrusion 335 is located on the sidewall 33 above the second latching portion 333, and the protrusion 335 is located on a right edge of each sidewall 33. In one embodiment, a line connecting the first latching portion 3311 and the second latching portion 3331 is substantially parallel to the base wall 31.

Figure 4:
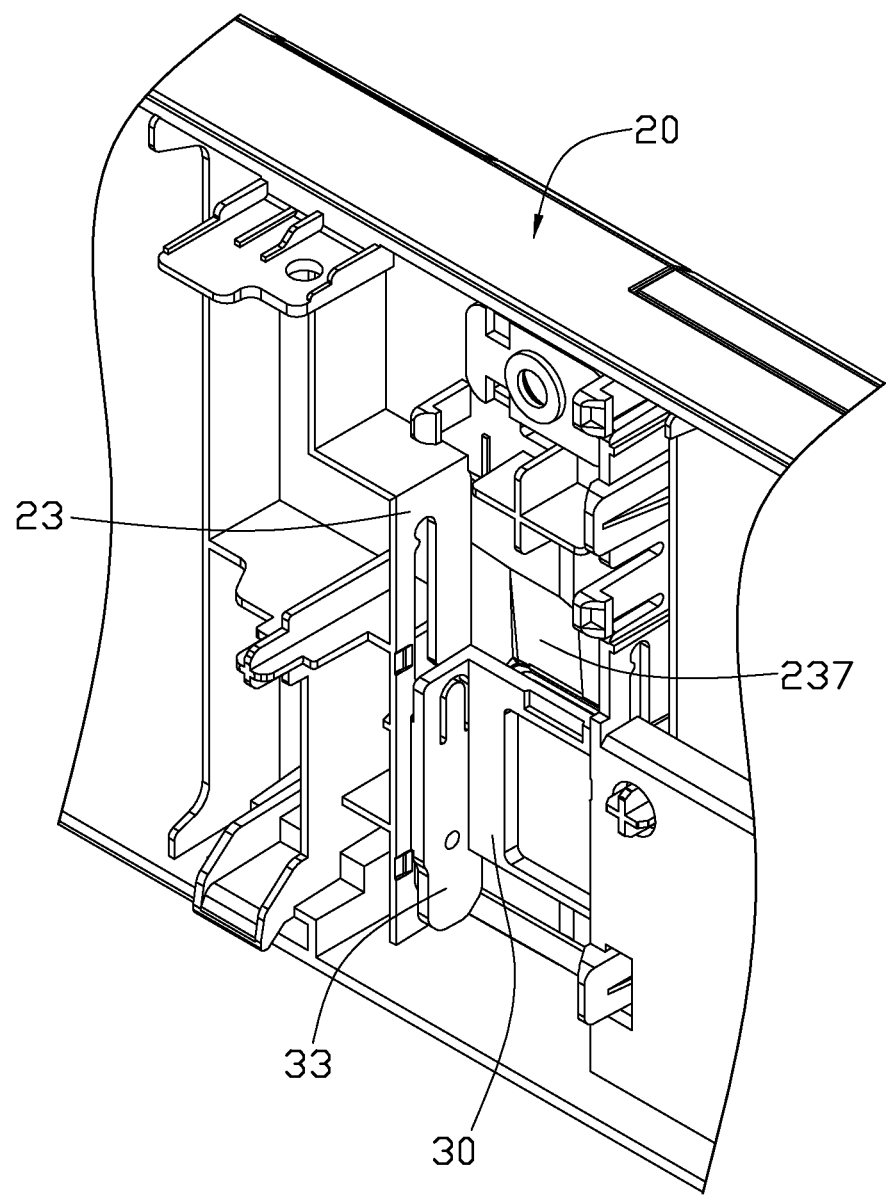
FIG. 4 is an assembled view of the enclosure and the cover of FIG. 1.

Referring to FIGS. 1 and 4, in assembly, the cover 30 is located at an inner side of the front panel 20. The resilient piece 331 and the extension piece 333 are squeezed by the corresponding sidewall 30 to be elastically deformed, until the first latching portion 3311 is aligned with the short portion 2311 of the first slot 231, and the second latching portion 3331 is aligned with the short portion 2311 of the second slot 233. The resilient piece 331 and the extension piece 333 elastically return. The first latching portion 3311 is engaged in the short portion 2311 of the first slot 231, and the second latching portion 3331 is engaged in the short portion 2311 of the second slot 233. The protrusion 335 is engaged in the recess 235. The cover 30 is in a first position, where the covering portion 311 is received in the opening 21, the covering board 3113 is covering the opening 21, and the operating portion 313 is exposed on an outer side of the panel 20.

Figure 5:
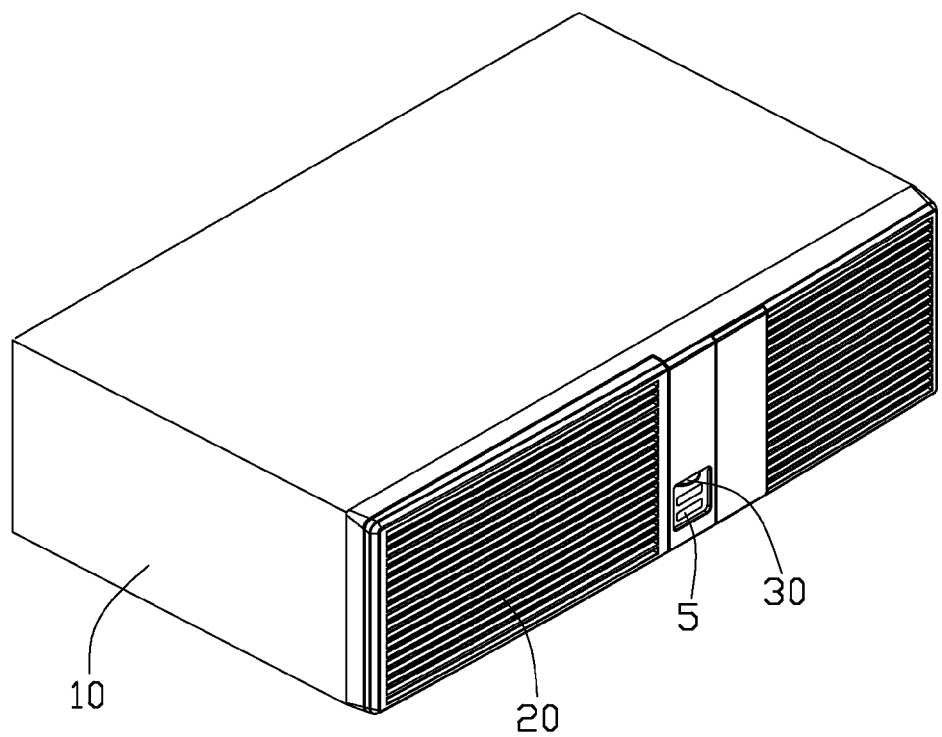
FIG. 5 is another assembled view of the enclosure of FIG. 1.

Referring to FIG. 5, the operating portion 313 is biased to slide the cover 30. The first latching portion 3311 and the second latching portion 3331 are slid along the long portion 2313, until the first latching portion 3311 is engaged in the stopping portion 2315. The cover 30 is in a second position, where the covering portion 311 is received in the receiving space 237 to uncover the opening 21.

It is to be understood, however, that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. An enclosure comprising:
   a chassis;
   a front panel installed on the chassis and defining an opening, two mounting boards located on the front panel and arranged at two opposite sides of the opening, each of the two mounting boards defining a first slot; and
   a cover comprising a base wall, two sidewalls located on opposite sides of the base wall, and two resilient pieces, each of the two resilient pieces extending from each of the two side walls, a first latching portion located on each of the two resilient pieces, a groove defined between each of the two sidewalls and each of the two resilient pieces,
   wherein the first latching portion of each of the two resilient pieces is engaged in the first slot of each of the two mounting boards, to secure the cover to the front panel, and each of the two resilient pieces is resiliently deformable to be received in the groove, to disengage the first latching portion of each of two resilient pieces from the first slot of each of the two mounting boards;
   the first slot of each of the two mounting boards comprises a first short portion, a first long portion communicating with the first short portion, and a stopping portion communicating with the first long portion, the cover is slidable relative to the front panel between a first position and a second position; when the cover is located in the first position, the first latching portion of each of the two resilient pieces is engaged in each first short portion; and when the cover is located in the second position, the first latching portion of each of the two resilient pieces is engaged in each stopping portion; and
   each of the two mounting boards defines a recess, a protrusion is located on each of the two sidewalls, and when the cover is located in the first position, the protrusion of each of the two sidewalls is engaged in the recess of each of the two mounting boards.

2. The enclosure of claim 1, wherein the cover further comprises a covering portion located on the base wall, wherein the covering portion is received in the opening to cover the opening.

3. The enclosure of claim 2, wherein the covering portion comprises a covering board, and the covering board is substantially parallel to the base wall.

4. The enclosure of claim 3, wherein the cover further comprises an operating portion located on the covering board, and the operating portion is substantially arc-shaped.

5. The enclosure of claim 1, wherein each of the two resilient pieces and each of the two sidewalls is in a same plane.

6. The enclosure of claim 1, wherein each of the two mounting boards defines a second slot, the cover further comprises an extension piece extending from each of the two sidewalls, a second latching portion is located on the extension piece of each of the two sidewalls, and the second latching portion of each of the two sidewalls is slidably engaged in the second slot of each of the two mounting boards.

7. The enclosure of claim 6, wherein the second slot of each of the two mounting boards comprises a second short portion and a second long portion communicating with the second short portion, and an obtuse angle is defined between each second short portion and each second long portion.

8. The enclosure of claim 7, wherein an extension direction of each second long portion is substantially parallel to each of the two mounting boards.

9. An enclosure comprising:
   a chassis;
   a front panel secured to the chassis, the front panel defining an opening;
   two mounting boards located on the front panel, each of the two mounting boards defining a first slot, the first slot of each of the two mounting boards comprising a first short portion, a first long portion communicating with the first short portion, and a stopping portion communicating with the first long portion;
   a cover comprising two first latching portions, each of the two first latching portions engaged in the first slot of each of the two mounting boards, to secure the cover to the front panel, wherein the cover is slidable relative to the front panel between a first position and a second position; when the cover is located in the first position, each of the two first latching portion portions is engaged in the short portion of each of the two mounting boards to cover the opening; when the cover is located in the second position, each of the two first latching portions is engaged in the stopping portion of each of the two mounting boards to uncover the opening;
   the cover further comprises a base wall and two sidewalls located on opposite sides of the base wall, and each of the two sidewalls is substantially perpendicular to the base wall; and
   each of the two mounting boards defines a recess, a protrusion is located on each of the two sidewalls, and when the cover is in the first position, the protrusion of each of the two sidewalls is engaged in the recess of each of the two mounting boards.

10. The enclosure of claim 9, wherein the cover further comprises two resilient pieces, each of the two resilient pieces extends from each of the two sidewalls, and each of the two first latching portions is located on an distal end of each of the two resilient pieces.

11. The enclosure of claim 10, wherein a groove is defined between each of the two sidewalls and each of the two resilient pieces, each of the two resilient pieces is resiliently deformable to be received in each groove, to disengage each of the two first latching portions from each of the first slot of each of the two mounting boards.

12. The enclosure of claim 10, wherein each of the two resilient pieces and each of the two sidewalls is in a same plane.

13. The enclosure of claim 9, wherein the cover further comprises an operating portion, and the operating portion is substantially arc-shaped.

14. The enclosure of claim 9, wherein each of the two mounting boards defines a second slot, an extension piece extends from each of the two sidewalls, a second latching portion is located on an distal of each extension piece, and the second latching portion of each of the two sidewalls is slidably engaged in the second slot of each of the two mounting boards.

15. The enclosure of claim 14, wherein the second slot of each of the two mounting boards comprises a second short portion and a second long portion, and an obtuse angle is defined between each second short portion and each second long portion.

16. The enclosure of claim 15, wherein an extension direction of each second long portion is substantially parallel to each of the two mounting boards.

* * * * *